United States Patent [19]

Seidel

[11] 3,836,863

[45] Sept. 17, 1974

[54] BROADBAND FREQUENCY STEERING NETWORK

[75] Inventor: Harold Seidel, Warren, N.J.

[73] Assignee: Bell Telephone Laboratories, Incorporated, Murray Hill, Berkeley Heights, N.J.

[22] Filed: Dec. 22, 1972

[21] Appl. No.: 317,620

[52] U.S. Cl. .................................... 330/53, 330/157
[51] Int. Cl. .............................................. H03f 3/60
[58] Field of Search ...................... 330/530; 333/110

[56] References Cited

UNITED STATES PATENTS 3,621,400 11/1971 Paciorek et al. .................. 333/11 X
3,740,756 6/1973 Sosin ................................ 333/11 X

*Primary Examiner*—Nathan Kaufman
*Attorney, Agent, or Firm*—W. L. Keefauver

[57] ABSTRACT

A frequency steering network, comprising an array of reactive couplers, is described. By suitable selection of the coupler parameters, and the circuits connected thereto, the network can be used to provide a broadband resistance having a prescribed resistance-frequency characteristic; to suppress spurious oscillations in the bias circuit of certain types of oscillators and amplifiers; and as a conventional multiplexer and demultiplexer.

12 Claims, 13 Drawing Figures

BROADBAND FREQUENCY STEERING NETWORK

This invention relates to broadband frequecy steering networks.

BACKGROUND OF THE INVENTION

In U.S. Pat. No. 3,621,463 and, more recently, in the copending application of C. A. Brackett, Ser. No. 304,629, filed Nov. 8, 1972, and assigned to applicant's assignee, the problem of spurious oscillations in IMPATT diode osciallators is discussed. In particular, it is noted that many negative resistance diodes, such as IMPATTS, often burn out when operated at only moderate power levels. This, it is found, is due to the tendency of the direct current bias circuit to break into spurious oscillations. Indeed, it is observed that the diode presents a negative resistance to the bias circuit over a range of frequencies that extends from zero frequency well into the microwave range of frequencies. So long as the positive resistance of the bias circuit is greater than the magnitude of the diode negative resistance, oscillations are suppressed. However, since both these resistances tend to vary considerably over the frequency spectrum, there are regions within which the positive loading is insufficient, and spurious oscillations can and do occur.

While it is always possible to include enough positive resistance in the bias circuit to insure that spurious oscillations are suppressed over the entire frequency spectrum, the inclusion of such a resistance results in a substantial d.c. power loss which, for many practical applications, is unacceptable. What is specifically required in an IMPATT oscillator is a broadband network that is capable of coupling the direct current bias source to the IMPATT diode through an essentially resistanceless path while, simultaneously, loading the diode with a positive resistance which, over most of the frequency band of interest, is independent of the actual output resistance of the bias source.

Thus, it is a specific object of the present invention to provide a broadband coupling network having a controlled input terminal resistance-vs-frequency characteristic.

Because all circuit components retain their nominal resistance, inductance or capacitance over only a very limited range of frequencies, a broadband impedance network is advantageously designed in sections, wherein each section is optimized to function over a specified portion of the band of interest. Means must then be provided for coupling the signal to the various sections. It is, therefore, a more general object of the present invention to steer a signal along different paths as a function of frequency.

SUMMARY OF THE INVENTION

A first embodiment of a frequency steering network in accordauce with the present invention comprises an array of $n$ lumped-element quadrature couplers. In a second illustrative embodiment, an array of $n$ three-port, constant-resistance couplers are used. In each case the couplers are characterized by a frequency variable coefficient of coupling $t$ between a first port and a second port, and a frequency variable coefficient of coupling $k$ between said first port and a third port, where coefficient $t$ is equal to unity at zero frequency and decreases with increasing frequency, whereas coefficient $k$ is equal to zero at zero frequency, and increases with increasing frequency. The frequency at which the incident power divides equally between ports 2 and 3, i.e., at which $|t|=|k|$, defines a crossover frequency $f_c$.

So characterized, the couplers are connected such that the second port of each of the first $n-1$ couplers in the array is connected to the first port of the next adjacent coupler. The first port of the first coupler in the array comprises the network broadband terminal. The second and third ports of the $n^{th}$ coupler, and the third ports of the other $n-1$ couplers constitute n+1 band-limited network terminals.

In a first application of the invention, the third port of each coupler and the second port of the $n^{th}$ coupler are connected to a different resistor. By the selection of the resistances of the $n+1$ resistors, the input resistance to the network, as measured at the network broadband terminal, can be fashioned to vary in an arbitrary way as a function of frequency.

Applications of the network in the bias circuit of oscillators and amplifiers, and its use as a multiplexer and demultiplexer are also described.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
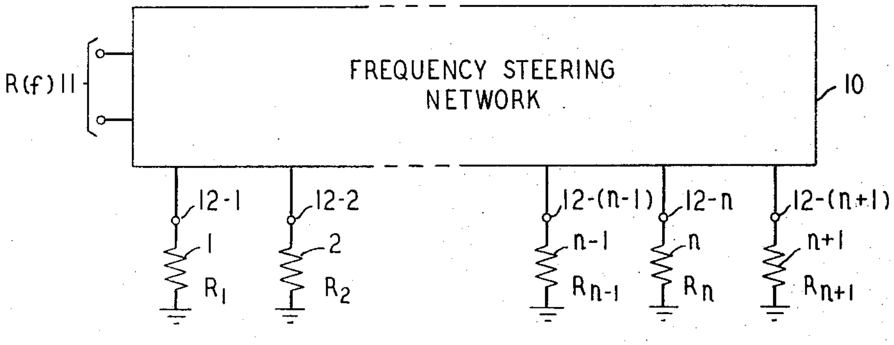
FIG. 1 shows, in block diagram, a circuit for producing an arbitrary resistance-vs-frequency characteristic in accordance with the present invention.

Referring to the drawings, FIG. 1 shows, in block diagram, a circuit for producing an arbitrary resistance-vs-frequency characteristic in accordance with the present invention. In general, the circuit comprises a frequency steering network 10 having a broadband terminal 11, and a plurality of $n+1$ band-limited terminals **12–1, 12–1, . . . , 12–*n*, 12 - (*n*+1) to which there are connected a plurality of resistors 1,2...*n*+1**, each one of which has a prescribed resistance $R_1, R_2, ..., R_{n+1}$ over at least a specified range of frequencies. In operation, network 10 selectively couples terminal 11 to the $n+1$ different resistors as a function of frequency. For example, at zero frequency netowrk 10 couples terminal 11 to resistor $n+1$. As the frequency increases from zero frequency, terminal 11 is coupled to a combination of resistor $n+1$ and the next adjacent resistor $n$, until ultimately a higher frequency $f_n$ is reached at which terminal 11 is coupled essentially to only resistor $n$. This process of steering the signal to successively adjacent resistors continues until terminal 11 is coupled to resistor 11 at the highest operating frequency of interest.

Figure 2:
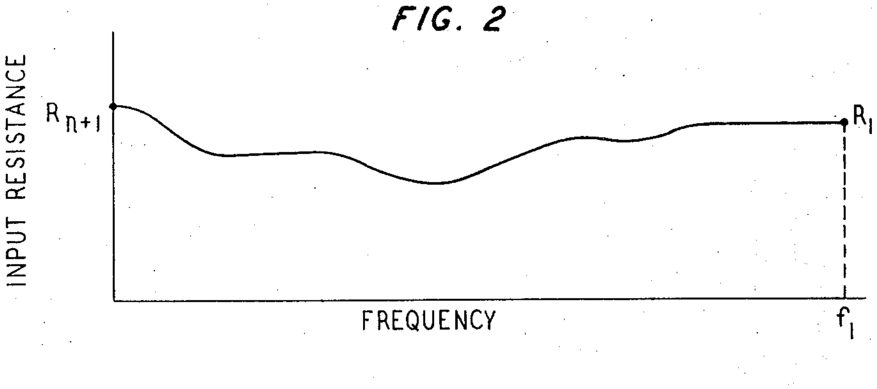
FIG. 2 shows an illustrative input resistance characteristic such as can be obtained by means of the circuit shown in FIG. 1.

The resulting resistance characteristic is illustrated generally in FIG. 2, which shows a plot of the resistance at terminal 11 as a function of frequency. At zero frequency, the resistance is equal to $R_{n+1}$. At the highest frequency $f_1$, the resistance is equal to $R_1$. At all intermediate frequencies between zero and $f_1$, the resistance is determined by the particular magnitudes of the various resistors. Within limits, essentially any arbitrary resistance characteristic can be realized.

Figure 3:
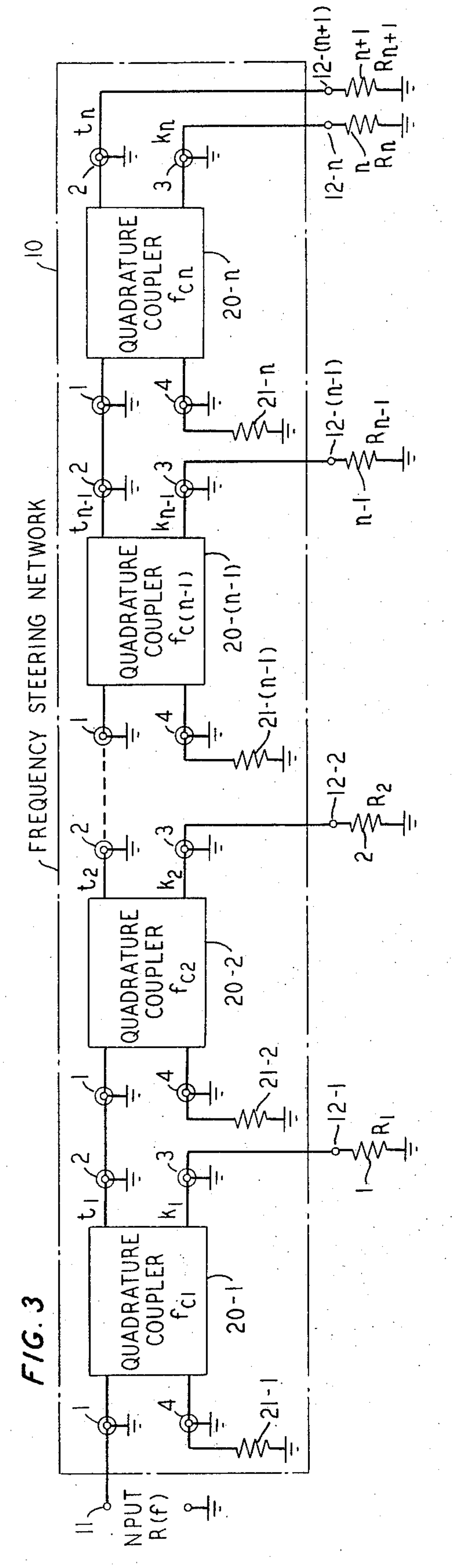
FIG. 3 shows a first specific embodiment of a frequency steering network in accordance with the present invention.

FIG. 3, now to be considered, shows a first specific embodiment of the invention wherein the frequency steering network comprises an array of $n$ quadrature hybrid couplers 20–1, 20–2 . . . 20–$n$. Each coupler has four ports in which the ports are arranged in pairs 1–4 and 2–3, with the ports comprising each pair being isolated from each other but in coupling relationship with the ports of the other of said pair. The couplers are arranged such that port 2 of each of the first $n$-1 couplers is connected to port 1 of the next adgacent coupler in the array. Port 2 of the $n^{th}$ coupler is connected to the ($n$+1)st resistor. Port 3 of each of the couplers is connected to one of the other $n$ resistors. Port 4 of each coupler is connected to a dummy terminating resistor 21–1, 21–2...21–$n$, each of which is equal to the characteristic impedance of the respective couplers. In the particular case where all the resistors 1, 2 . . . $n$+1 have equal magnitudes, the characteristic impedances of the couplers are equal to this same resistance. In the more general case where the resistors have different resistances, the characteristic impedance of each coupler is equal to the average resistance of the two resistors connected to the respective coupler ports 2 and 3.

Figure 4:
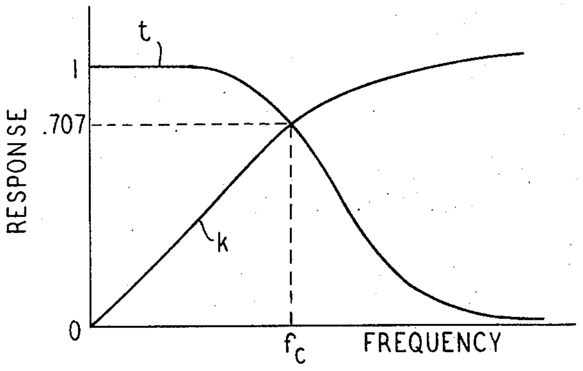
FIG. 4 shows the variations in $t$ and $k$ as a function of frequency of a lumped-element quadrature coupler.

Of particular interest to the present invention are the lumped-element couplers described in my U.S. Pat. No. 3,500,259, and those described in my copending application Ser. No. 257,874, filed May 30, 1972, and assigned to a common assignee. In general, such couplers can be characterized by a coefficient of transmission $t$ between ports 1 and 2, and a coefficient of cou;ling $k$ between ports 1 and 3, where $t$, which is equal to unity at zero frequency, decreases with increasing frequency, whereas $k$, which is equal to zero at zero frequency, increases with increasing frequency. Being reactive couplers, $t$ and $k$ are related by $|k^2| + |t^2| = 1$. The particular frequency at which $|k| = |t|$ is referred to as the crossover frequency, $f_c$. Well below $f_c$ essentially all of the input signal is coupled from coupler port 1 to port 2. Well above $f_c$ essentially all of the input signal is coupled from coupler port 1 to port 3. The sharpness of the transition is determined by the coupler design. FIG. 4, by way of example, shows the above-described variations in the coefficients of transmission and coupling for a typical lumped-element coupler, and the crossover frequency $f_c$.

As indicated hereinabove, the function of the frequency steering network is to selectively couple a signal applied to terminal 11 to the different resistors as the frequency changes. For example, at zero frequency the coefficient of transmission of each coupler is unity so that the input signal is coupled directly through to port 2 of coupler 20–$n$ where it "sees" resistor $n+$. As the signal frequency increases, coupler 20–$n$, with the lowest crossover frequency, $f_{cn}$, in the array, starts to couple some of the input signal to port 3 where it starts to see resistor $n$. Ultimately, a frequency $f_n$ above $f_{cn}$ is reached where the coefficient of transmission $t_n$ of coupler 20–$n$ is essentially zero, while $k_n$ is equal to unity. At this point all of the signal is coupled to port 3 of coupler 20–$n$ where it essentially sees only resistor $n$. Thus, in the interval between zero frequency and $f_n$, the input terminal impedance R(f) has changed from $R_{n+1}$ to $R_n$.

Figure 5:
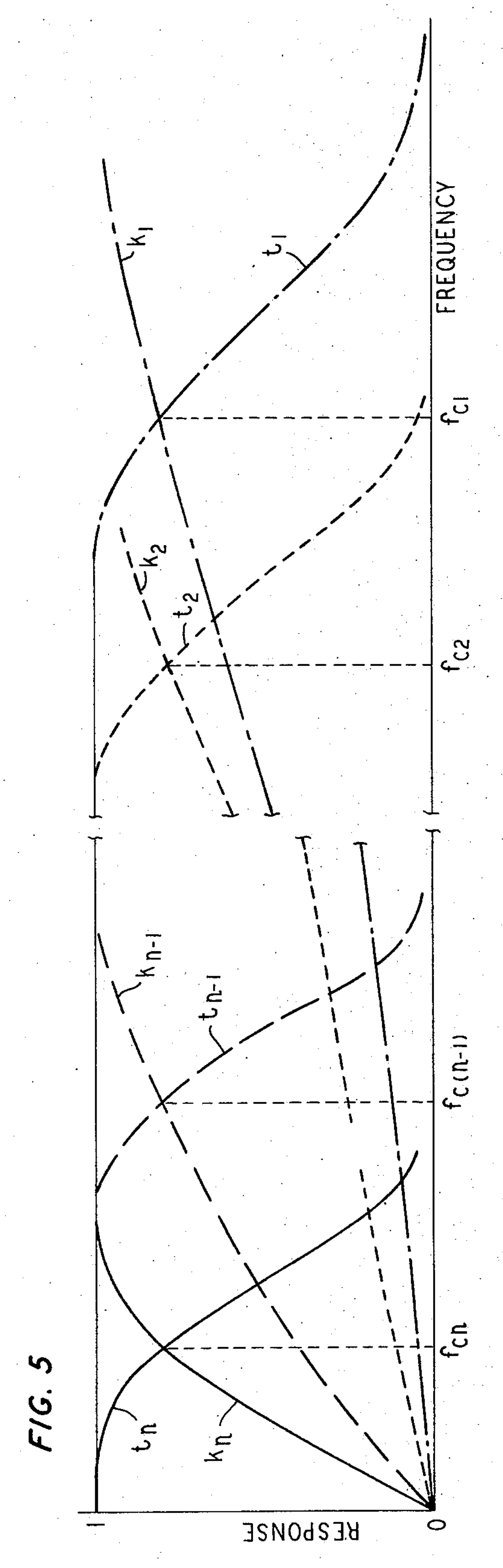
FIG. 5 shows the frequency distribution of the coefficients of transmission and coupling of the couplers used in the steering network illustrated in FIG. 3.

As the frequency increases still further, coupler 20–($n$−1) starts to steer the input signal away from coupler 20–$n$, and resistor $n$, to resistor $n$−1. By suitable seldction of the crossover frequency of coupler 20–(n−1), all of the signal is coupled to resistor $n$−1 at a specified frequency $f_{n-1}$. More generally, each coupler, in turn, steers the signal to each of the resistors $n$, $n$−1 . . . 2, 1 by increasing the crossover frequencies of the respective couplers from a lowest frequency for the $n^{th}$ coupler, to a highest frequency for the first coupler. The resulting distribution of transmission and coupling coefficients for the frequency steering network illustrated in FIG. 3 is shown in FIG. 5.

Figure 6:
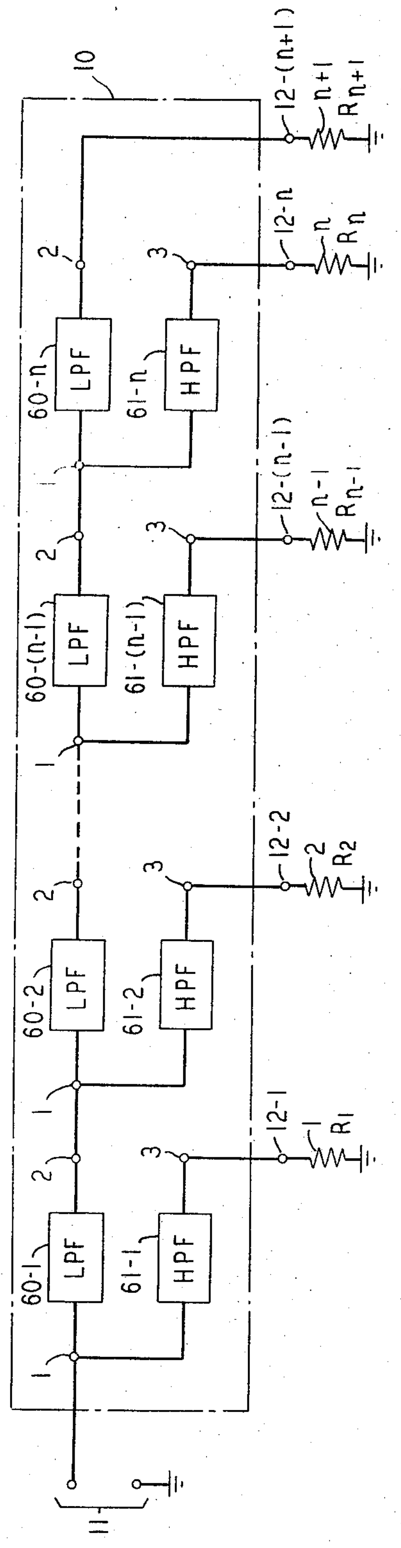
FIG. 6 shows in block diagram a second embodiment of the invention.

FIG. 6, now to be considered, shows an alternate embodiment of the present invention wherein frequency steering network 10 comprises $n$ low-pass filters (LPF) 60–1, 60–2 . . . 60–$n$, and $n$ high-pass filters (HPF) 61–1, 61–2 . . . 61–$n$, connected to form an array of $n$ three-port couplers. Each coupler, in addition, includes one low-pass filter and one high-pass filter wherein one end of each is connected to the other to form a first port; the other end of the low-pass filter constitutes the second port; and the other end of the high-pass filter constitutes the third port. As in the embodiment of FIG. 3, port 2 of each of the first $n$−1 couplers in the array is connected to port 1 of the next adjacent coupler. Port 1 of the first coupler constitutes the network broadband terminal 11, while the remaining coupler ports constitute the $n$+1 band-limited network terminals 12–1, 12–2...12–($n$+1).

As above, each coupler can be characterized by a coefficient of transmission $t$ between ports 1 and 2, and a coefficient of coupling $k$ between ports 1 and 3. In addition, by the proper selection of filter parameters each filter-pair can be designed to form a constant impedance network of the type described by E. A. Guillemin at page 476 of his book entitled "Synthesis of Passive Networks" (published 1957 by John Wiley & Sons, Inc.). As one example, and solely for purposes of explanation, reference is now made to the network shown in FIG. 7, wherein each low-pass filter is a simple inductor, and each high-pass filter is a simple capacitor.

As is readily apparent, the transmission $t$ between ports 1 and 2 of each of the couplers is unity at zero frequency, and decreases as the frequency increases. On the other hand, the coupling $k$, between ports 1 and 3 is zero at zero frequency, and increases with increasing frequency. Thus, the relevant transmission and coupling characteristics of each filter pair are basically the same as that described hereinabove in connection with FIGS. 3 and 4.

It can also be shown that if ports 2 and 3 of such a coupler are terminated by resistors of magnitude R, and the parameters of the respective filters are related by $$(L/R = CR\ , \tag{1}$$

the net impedance at port 1, as a function of frequency, is real and remains a constant equal to R.

In the context of the present case, equal resistance at coupler ports 2 and 3 would mean that $$R_1 = R_2 = \ldots = R_n = _{Rn+1} \tag{2}$$

If the resistances are not exactly equal, but differ by only a few percent, an average resistance can be used for the R parameter in equation (1) in which case the input impedance may vary slightly with frequency. To the extent that very accurate impedance conditions must be maintained, more filter sections can be used, and the required input resistance characteristic obtained with smaller resistive differences per coupler.

With the coefficient of transmission $t$ decreasing, and the coefficient of coupling $k$ increasing, a crossover frequency $f_c$, at which $t = k$, is obtained when $$f_c = (1/2\pi CR) = (r/2\pi L). \tag{3}$$

In particular, this is the frequency at which the resistors connected to coupler ports 2 and 3 contribute equally to the net input resistance at port 1.

It will be noted that equations (1) and (3) include three independent parameters L, C and $f_c$. Thus, one of them must be arbitrarily seldcted in order to uniquely define the remaining two. In this connection it should be noted that in any practical case the resistance capacitance and inductance of the respective circuit components are nominally constants over only a limited band of frequencies. For example, spurious shunt capacitance associated with an inductor or a resistor serves to short circuit the inductor or resistor as the frequency increases. Similarly, spurious series inductance associated with a capacitor serves to increase its impedance with increasing frequency. Thus, in practice, each coupler section is designed to operate over only a limited band of frequencies, and its crossover frequency is selected to fall within this defined band. Once the crossover frequency is selected, the inductances and capacitance for each section can be calculated by means of equation (1) and (3).

Figure 7:
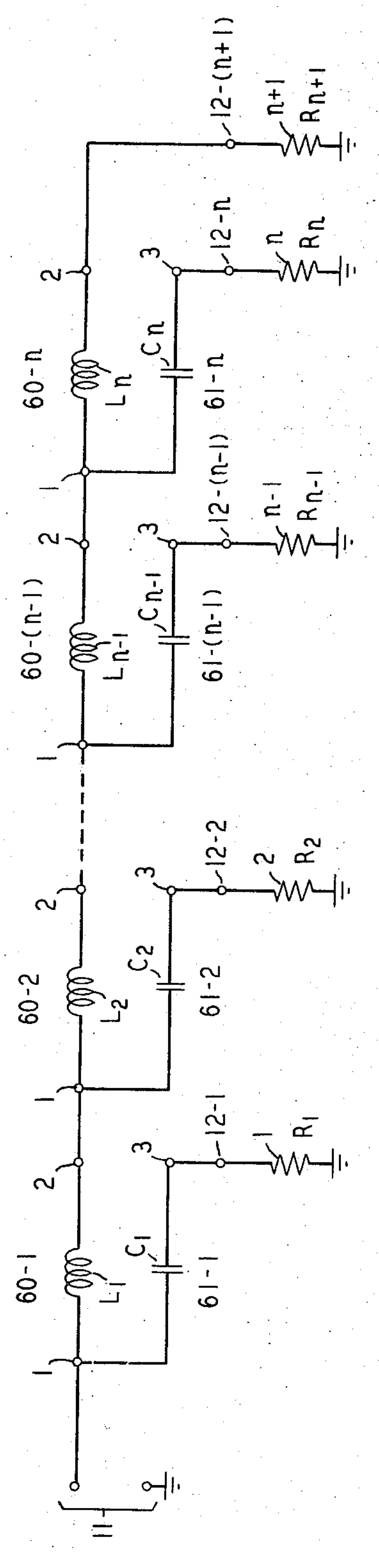
FIG. 7 shows a specific illustration of the second embodiment of the invention.

While the specific shape of the curves may differ, the resulting distribution of transmission and coupling characteristics for the steering network shows generally in FIG. 6 and more specifically in FIG. 7 are essentially as illustrated in FIG. 5. In all cases the $n^{th}$ coupler, having the lowest crossover frequency, defines the network input resistance characteristic over the lowest portion of the band of interest, while each succeeding coupler defines the input impedance over a limited band of somewhat higher frequencies.

Having described the frequency steering network generally, and illustrated how it can be used to control the input impedance at its input terminal a number of other specific uses will now be considered.

Oscillator

Figure 8:
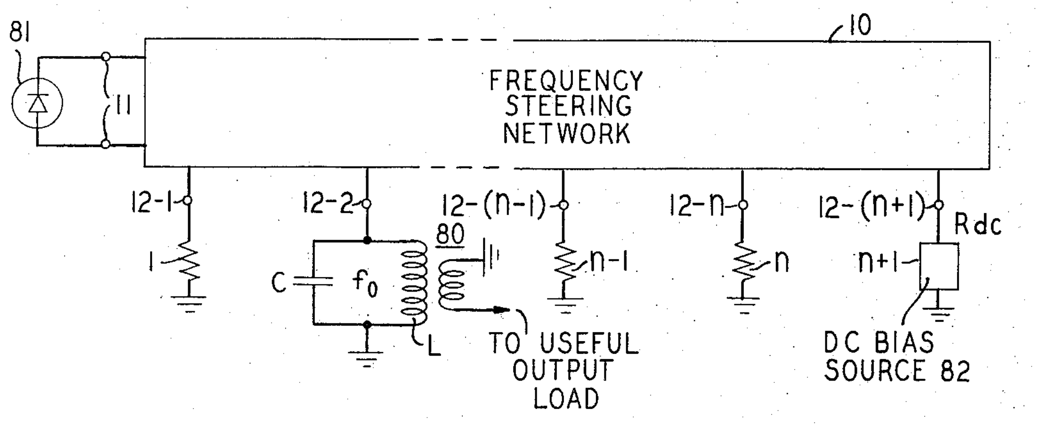
FIGS. 8 and 9 show two oscillator circuits employing frequency steering networks.

As indicated hereinabove, some means must be provided for suppressing spurious oscillations that tend to occur in the bias circuit of certain negative resistance diodes. FIG. 8, now to be considered, shows the manner in which a frequency steering network of the type described hereinabove can be used for this purpose. As shown, the oscillator circuit comprises a diode 81 connected to terminal 11 of frequency steering network 10, along with a plurality of resistive loads 1, 2, . . .$n-1$, $n$ and $n+1$ connected to the respective band-limited network terminals 12–1, 12–1. . . 12–($n$+1). In this application, the $(n+1)^{th}$ load is a direct current bias source 82, and one of the other loads (in this case loads 2) is an L-C resonant circuit 80, tuned to a frequency $F_o$, and inductively coupled to a useful output load.

In operation, diode 81 is biased by means of source 82 to a point within the negative resistance region of its current-voltage characteristic. Since the transmission between terminal 11 and network terminal 12–($n$+1) is unity, the bias in principle, is applied to the diode with no loss. In addition, the impedance that network 10 impresses across the diode at zero frequency is, as indicated in FIG. 2, equal to the zero frequency resistance of resistor $n+1$. In the instant case this is equal to the output impedance of source 82 and is designated $R_{dc}$. This resistance, however, will remain constant over only a small range of frequencies. Beyond some relatively low frequency, $f_n$, the bias source output impedance becomes complex and its resistive component can either increase or decrease. To insure that the resistance across the diode remain greater than the magnitude of the diode negative resistance as the impedance of source 82 changes, network 10 steers the diode to the next, or $n^{th}$ resistor. Similarly, over the range of higher frequencies, the diode sees, in turn, the other load resistors connected to network 10. In this way, the negative resistance generated by diode 81 at all frequencies, other than the oscillator frequency of interest, is loaded by a positive resistance of greater magnitude.

At the frequency of interest, $f_o$, on the other hand, diode 81 is coupled by network 10 to tuned circuit 80. If the loading presented by circuit 80 is initially less than the magnitude of the negative resistance generated by diode 81, the circuit will oscillate at frequency $f_o$. Thus, a frequency steering network in accordance with the present invention can be used to provide a low-loss direct current path between a negative resistance diode and its bias souce and, simultaneously, to provide a resistive loading across a broadband of requencies of sufficient magnitude to suppress spurious oscillations at frequencies other than the particular frequency of of interest.

The bandwidth of the resulting oscillations will depend upon the characteristics of the couplers making up the steering network. In general, the sharper the $t$ and $k$ characteristics are in the region of the crossover, the narrower will be the bandwidth. Thus, it is advantageous to employ coupler networks of the type described in my copending application Ser. No. 257,874, filed May 30, 1972. If three-port, constant-resistance networks are used, filter sections having sheeper skirts in the crossover rdgion are advantageously used. Examples of such circuits are given by Guillemin in his above-identified book.

Figure 9:
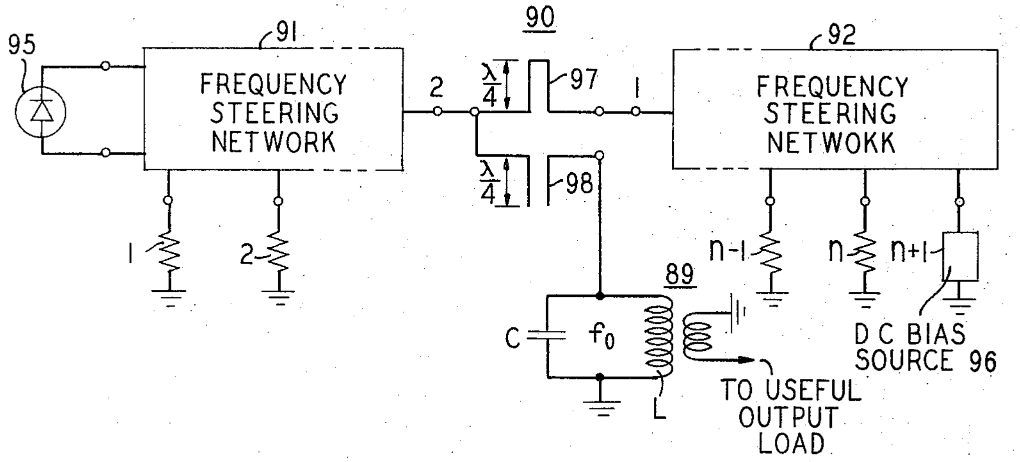

In an alternate arrangement for obtaining a narrow band signal source, a separate resonant, signal trapping network can be included in the frequency steering network, as shown in FIG. 9. In this arrangement the frequency steering network is divided into two sections 91 and 92 that are connected together by means of a signal trapping circuit 80. The latter comprises a series-connected quarter wave stub 97 which connects port 2 of the last coupler in network 91 to port 1 of the first coupler in network 92. A resonant circuit 89, tuned to the frequency of interest, $f_o$, is connected to port 2 of the last coupler of network 91 by means of an open-circuited quarter-wave stub 98. Diode 95 is connected to the input terminal of network section 91, and the direct current bias souce 96 is connected to terminal 2 of the last coupler in network section 92. Load resistors 1, 2, . . . $n-1$ and $n$ are connected to coupler ports 3 as explained hereinabove.

As is known, a short-circuited, quarter-wave stub appears as an open-circuit at its input end. Thus, stub 97 appears as a very high impedance in series with network 92 at frequency $f_o$. Conversely, open-circuited stub 98 appears as a short circuit in series with tuned circuit 89. The latter, which is tuned to $f_o$, is thereby coupled to diode 95, inducing oscillations at the desired frequency. The bandwidth of the oscillation is defined by the bandwidth of the stubs, which can be made very narrow. In all other respects, the network operates as described hereinabove.

Amplifiers

In the previous section it was explained how one of the resistors connected to the appropriate coupler in a frequency steering network can be replaced by a tuned circuit to produce an oscillator. In this latter application, the net positive loading provided by the tuned circuit is initially less than the negative resistance provided by the active circuit element. More generally, a negative resistance can also be used to amplify an externally applied signal. In this latter case, the loading effect of the useful load is greater than the magnitude of the negative resistance. Such an amplifier, shown in FIG. 10, comprises a frequency steering network 100 wherein the resistive loads connected to the $i^{th}$ and $j^{th}$ network terminals are replaced by useful output loads which are coupled to network 100 by means of three-port circulators 103 and 104, respectively. In particular, the $i^{th}$ terminal, (i.e., port 3 of the $i^{th}$ coupler in network 100) is connected to port 2 of circulator 103, and the $j^{th}$ terminal, (i.e., port 3 of the $j^{th}$ coupler) is connected to port 2 of circulator 104. A first input signal at frequency $F_i$ is coupled to port 1 of circulator 103, and a useful output load is coupled to port 3. Similarly, a second input signal at frequency $F_j$ is coupled to port 1 of circulator 104 and a second useful output load to port 3. The rest of the circuit is the same as heretofore, with a negative resistance diode 101 connected to network terminal 11; a bias source 102 connected to the $(n+1)^{th}$ terminal of the network; and a pluality of load resistors connected to remaining terminals of the steering network.

In operation, the negative resistances produced by diode 101 at frequencies $F_i$ and $F_j$ serve to amplify the signals coupled to the diode by means of the steering network and the respective circulators. At all other frequencies, the respective resistors serve solely to load down the diode so as to prevent spurious oscillations in the manner described hereinabove.

Figure 10:
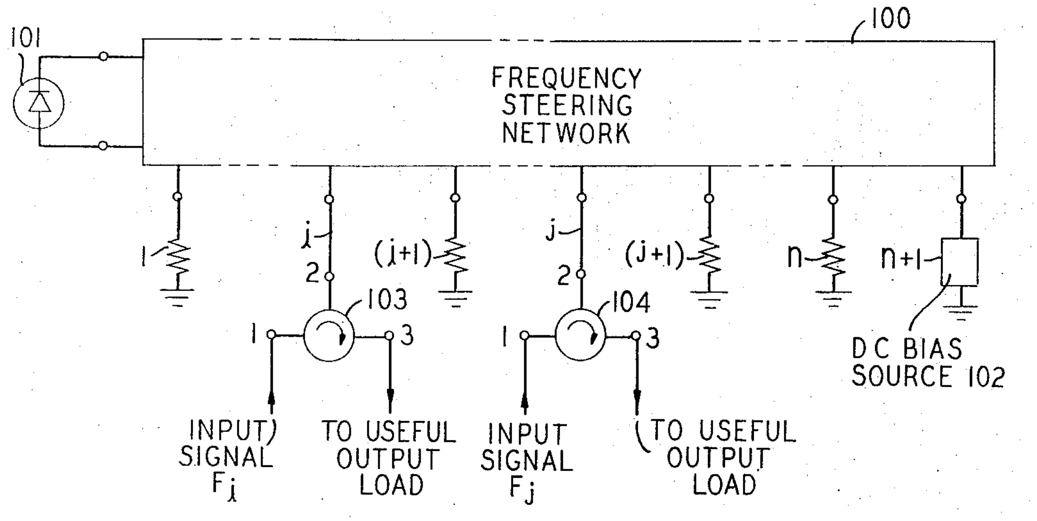
FIGS. 10 and 11 illustrate the use of a frequency steering network in an amplifier.

To control the amplifier bandwidth more accurately, the amplifier shown in FIG. 10 can be modified in the manner described in connection with FIG. 9. That is, the frequency steering network can be divided at the appropriate point, and a resonant signal trapping circuit inserted between the network sections to isolate the band of frequencies of interest. It will also be recognized that whereas two signals are shown being amplified in FIG. 10, in principle the circuat can be used to amplify more than two different frequency signals, or only one.

Figure 11:
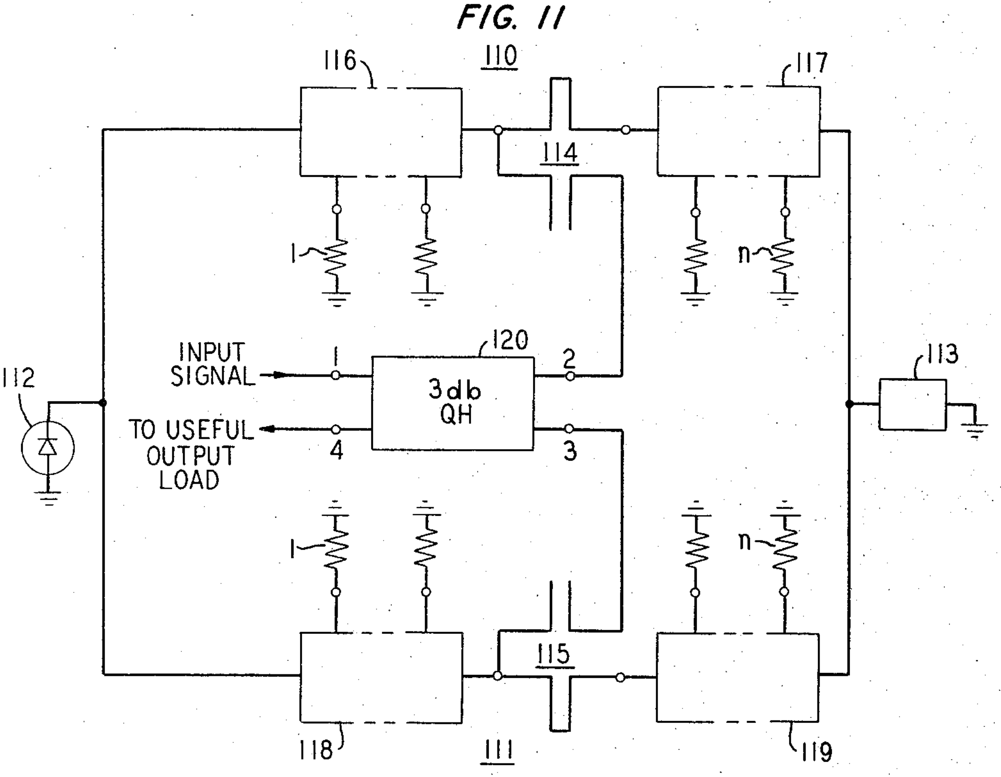

FIG. 11 shows an alternate amplifier arrangement employing two frequency steering networks 110 and 111 connected in parallel between diode 112 and bias circuit 113. For purposes of illustration, each network is separated by means of a signal trapping network into two portions. Thus, trapping network 114 separates steering network 110 into two portions 116 and 117, and trapping network 115 separates steering network 111 into two portions 118 and 119, where portions 116 and 118 are identical, and portions 117 and 119 are identical.

The trapping networks couple diode 112 to a pair of conjugate ports 2 and 3 of a 3 db quadrature coupler 120. An input signal is coupled to port 1 of coupler 120 and a useful output load to port 4. In operation, the two equal negative resistances supplied by diode 112 to conjugate ports 2 and 3 of coupler 120 by means of networks 114 and 115 serve to amplify the input signal components coupled thereto from coupler input port 1. The amplified signal components, combined constructively in output port 4 are, in turn, applied to the useful output load connected thereto.

Multiplex and Demultiplexer

Figure 12:
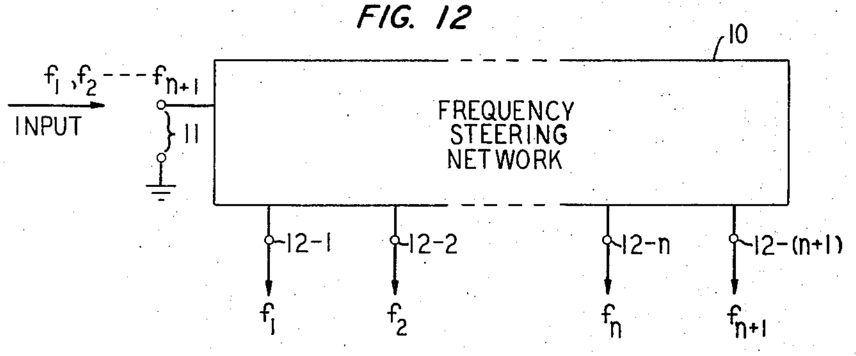
FIGS. 12 and 13 illustrate the use of a frequency steering network as a demultiplexer and as a multiplexer.
Figure 13:
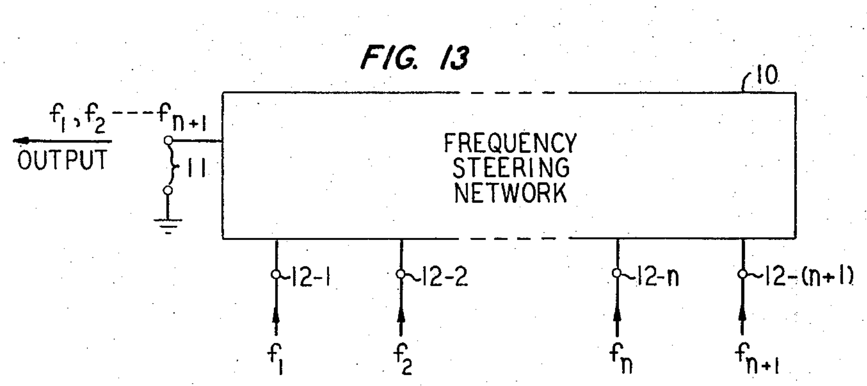

Frequency steering network 10 can also be used as a conventional demultiplexer and multiplexer as illustrated in FIGS. 12 and 13. When used as a demultiplexer, as illustrated in FIG. 12, a multifrequency input signal, comprising a plurality of signal channels centered at frequencies $f_1, f_2..f_n, f_{n+1}$, is applied to broadband network terminal 11, where the signal frequencies are related to the coupler crossover frequencies as follows: $f_1 > f_{c1} > f_2 > f_{c2} > f_3 > f_{c3} > . . . > f_n > f_{cn} > f_{n+1}$. So related, a different channel will appear at each of the band-limited network terminals 12–1, 12–2 . . . 12 – ($n$+1), as indicated in FIG. 12.

Since network 14 is a linear, bilateral network, the application of the different frequency signals defined above to the respective network terminals 12–1, 12–2 . . . 12 – ($n$+1) will result in their combination in network terminal 11, as indicated in FIG. 13.

Summary

A frequency steering network is disclosed which is capable of providing a broadband resistance at its input terminal, which resistance varies as an arbitrary function of frequency. Such a network can be used to stabilize oscillators and amplifiers by loading down a negative resistance generator at all frequencies outside the band or bands of interest. In particular, a circuit of the type described can be used in the bias circuit of a diode oscillator or amplifier to provide essentially lossless direct current coupling between the diode and its bias source and, simultaneously, to suppress spurious oscillations.

The network can also be used in the conventional way as either a multiplexer or demultiplexer.

Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

I claim:

1. A frequency steering network comprising:

an array of reactive couplers, connected in ordered succession from a first coupler to an $n^{th}$ coupler, each of which is characterized by a coefficient of transmission $t$ between a first port and a second port, and a coefficient of coupling $k$ between said first port and a third port;

said coefficients of transmission being equal to unity at zero frequency and decreasing with increasing frequency;

said coefficients of coupling being equal to zero at zero frequency and increasing with increasing frequency; characterized in that:

the second port of each of the first $n-1$ couplers in said array is connected to the first port of the next adjacent coupler in said array;

the first port of the first coupler in said array constitutes the broadband terminal of said network;

the second port of the $n^{th}$ coupler and the third ports of said $n$ couplers constitute $n+1$ band-limited network terminals;

and in that the crossover frequencies of said couplers increase monotonically from a lowest frequency for said $n^{th}$ coupler to a highest frequency for said first coupler, where the crossover frequency is that frequency at which $|k| = |t|$ for the respective couplers.

2. The network according to claim 1 wherein said couplers are four-port, lumped-element quadrature coupler;

and wherein the fourth port of each coupler is match-terminated.

3. The network according to claim 1 wherein said couplers are three-port couplers comprising:

a low-pass filter connected between ports 1 and 2; and a high-pass filter connected between ports 1 and 3.

4. The network according to claim 3 wherein said low-pass filter is an inductor;

and said high-pass filter is a capacitor.

5. The network according to claim 3 wherein said filters form a constant resistance network.

6. The network according to claim 1 wherein a separate resistor is connected to each of said n+1 band-limited terminals.

7. The network according to claim 1 wherein a direct current bias source is connected to port 2 of the $n^{th}$ coupler in said array;

a diode capable of exhibiting a negative resistance is connected to the broadband terminal of said network;

a resonant circuit tuned to a frequency of interest is coupled to one of the other network terminals;

means are provided for coupling wave energy out of said tuned circuit;

and wherein a separate resistor is connected to each of the other network terminals.

8. The network according to claim 7 wherein said diode is biased to a point within the negative resistance region of its current-voltage characteristic;

and wherein the magnitude of each of said resistors is greater than the negative resistance generated by said diode at frequencies outside the frequency band of interest defined by said resonant circuit.

9. The network according to claim 1 wherein a signal trapping circuit is included between the $i^{th}$ coupler in said array and the next adjacent coupler;

characterized in that:

said trapping circuit comprises;

a band-rejection filter tuned to a frequency $f_o$, connected between port 2 of said $i^{th}$ coupler and port 1 of the next adjacent coupler;

and a band-pass filter tuned to said frequency $f_o$ connected between said port 2 and said trapping circuit output port.

10. The network according to claim 1 wherein a plurality of different frequency signals are applied to the network band-limited terminals;

and a multiplexed output signal is extracted from the network broadband terminal.

11. The network according to claim 1 wherein a much frequency signal is applied to the network broadband terminal;

and a plurality of different frequency signals are extracted from the network band-limited terminals.

12. The network according to claim 1 wherein a direct current bias source is connected to port 2 of the $n^{th}$ coupler in said array;

a diode capable of exhibiting a negative resistance is connected to port 1 of the first coupler in said array;

means are provided for coupling an input signal to be amplified to at least one of the other network terminals, and for extracting an amplified signal;

and wherein a separate resistor is connected to each of the other network terminals.

* * * * *